US007328113B2

(12) United States Patent
Rothman et al.

(10) Patent No.: US 7,328,113 B2
(45) Date of Patent: Feb. 5, 2008

(54) METHOD FOR CALIBRATING A VOLUMETRIC FLOW METER HAVING AN ARRAY OF SENSORS

(75) Inventors: Paul Rothman, Windsor, CT (US); Daniel L. Gysling, Glastonbury, CT (US); Douglas H. Loose, Southington, CT (US); Alex Kravets, Bridgewater, NJ (US)

(73) Assignee: CiDRA Corporation, Wallingford, CT (US)

( * ) Notice: Subject to any disclaimer, the term of this patent is extended or adjusted under 35 U.S.C. 154(b) by 0 days.

(21) Appl. No.: 11/603,686

(22) Filed: Nov. 21, 2006

(65) Prior Publication Data

US 2007/0067116 A1 Mar. 22, 2007

Related U.S. Application Data

(63) Continuation of application No. 10/720,599, filed on Nov. 24, 2003, now Pat. No. 7,139,667.

(60) Provisional application No. 60/511,399, filed on Oct. 15, 2003, provisional application No. 60/510,765, filed on Oct. 9, 2003, provisional application No. 60/428,312, filed on Nov. 22, 2002.

(51) Int. Cl.
*G01N 11/00* (2006.01)
(52) U.S. Cl. ...................................... 702/50
(58) Field of Classification Search ................ 702/50
See application file for complete search history.

(56) References Cited

U.S. PATENT DOCUMENTS 4,048,853 A 9/1977 Smith et al.

(Continued)

FOREIGN PATENT DOCUMENTS

WO    WO 93/14382    7/1993

(Continued)

OTHER PUBLICATIONS

"Noise and Vibration Control Engineering Principles and Applications", Leo L. Beranek and Istvan L. Ver, A. Wiley Interscience Publication, pp. 537-541, Aug. 1992.

(Continued)

*Primary Examiner*—John Barlow
*Assistant Examiner*—Cindy D. Khuu
(74) *Attorney, Agent, or Firm*—Michael Grillo

(57) ABSTRACT

A method and apparatus are provided for calibrating a flow meter having an array of sensors arranged in relation to a pipe that measures a flow rate of a fluid flowing in the pipe. The method features the step of calibrating the flow rate using a calibration correction function based on one or more parameters that characterize either the array of sensors, the pipe, the fluid flowing in the pipe, or some combination thereof. The calibration correction function depends on either a ratio t/D of the pipe wall thickness (t) and the pipe inner diameter (D); a ratio t/λ of the pipe wall thickness (t) and the eddie wavelength (λ) of the fluid; a Reynolds number ($\rho UD/\mu$) that characterizes the fluid flow in the pipe; a ratio $\Delta x/D$ of the sensor spacing ($\Delta x$) and the pipe inner diameter (D); a ratio $f\Delta x/U_{meas}$ of usable frequencies in relation to the sensor spacing ($\Delta x$) and the raw flow rate ($U_{meas}$); or some combination thereof. The apparatus takes the form of a flow meter having a calibration correction function module performing the aforementioned functionality.

19 Claims, 8 Drawing Sheets

U.S. PATENT DOCUMENTS

| | | | |
|---|---|---|---|
| 4,080,837 A | 3/1978 | Alexander et al. |
| 4,248,085 A | 2/1981 | Coulthard |
| 4,445,389 A | 5/1984 | Potzick et al. |
| 4,896,540 A | 1/1990 | Shakkottai et al. |
| 5,040,415 A | 8/1991 | Barkhoudarian |
| 5,083,452 A | 1/1992 | Hope |
| 5,179,862 A | 1/1993 | Lynnworth |
| 5,218,197 A | 6/1993 | Carroll |
| 5,285,675 A | 2/1994 | Colgate et al. |
| 5,367,911 A | 11/1994 | Jewell et al. |
| 5,398,542 A | 3/1995 | Vasbinder |
| 5,524,475 A | 6/1996 | Kolpak et al. |
| 5,526,844 A | 6/1996 | Kamen et al. |
| 5,591,922 A | 1/1997 | Segeral et al. |
| 5,741,980 A | 4/1998 | Hill et al. |
| 5,770,805 A | 6/1998 | Castel |
| 5,770,806 A | 6/1998 | Hiismaki |
| 5,835,884 A | 11/1998 | Brown |
| 5,845,033 A | 12/1998 | Berthold et al. |
| 5,948,959 A | 9/1999 | Peloquin |
| 6,016,702 A | 1/2000 | Maron |
| 6,026,693 A | 2/2000 | Baumoel et al. |
| 6,151,958 A | 11/2000 | Letton et al. |
| 6,202,494 B1 | 3/2001 | Riebel et al. |
| 6,354,147 B1 | 3/2002 | Gysling et al. |
| 6,378,357 B1 | 4/2002 | Han et al. |
| 6,435,030 B1 | 8/2002 | Gysling et al. |
| 6,443,226 B1 | 9/2002 | Diener et al. |
| 6,450,037 B1 | 9/2002 | McGuinn et al. |
| 6,463,813 B1 | 10/2002 | Gysling |
| 6,536,291 B1 | 3/2003 | Gysling et al. |
| 6,550,342 B2 | 4/2003 | Croteau et al. |
| 6,558,036 B2 | 5/2003 | Gysling et al. |
| 6,587,798 B2 | 7/2003 | Kersey et al. |
| 6,601,458 B1 | 8/2003 | Gysling et al. |
| 6,609,069 B2 | 8/2003 | Gysling |
| 6,691,584 B2 | 2/2004 | Gysling et al. |
| 6,698,297 B2 | 3/2004 | Gysling |
| 6,732,575 B2 | 5/2004 | Gysling et al. |
| 6,782,150 B2 | 8/2004 | Davis et al. |
| 6,813,962 B2 | 11/2004 | Gysling et al. |
| 6,837,098 B2 | 1/2005 | Gysling et al. |
| 6,862,920 B2 | 3/2005 | Gysling et al. |
| 6,868,737 B2 | 3/2005 | Croteau et al. |
| 6,889,562 B2 | 5/2005 | Gysling et al. |
| 6,898,541 B2 | 5/2005 | Gysling et al. |
| 7,139,667 B2 * | 11/2006 | Rothman et al. ............ 702/50 |
| 2002/0123852 A1 | 9/2002 | Gysling et al. |
| 2002/0129662 A1 | 9/2002 | Gysling et al. |
| 2003/0038231 A1 | 2/2003 | Bryant et al. |
| 2003/0089161 A1 | 5/2003 | Gysling |
| 2003/0136186 A1 | 7/2003 | Gysling et al. |
| 2003/0154036 A1 | 8/2003 | Gysling et al. |
| 2004/0016284 A1 | 1/2004 | Gysling et al. |
| 2004/0069069 A1 | 4/2004 | Croteau et al. |
| 2004/0074312 A1 | 4/2004 | Gysling |
| 2004/0144182 A1 | 7/2004 | Gysling et al. |
| 2004/0149027 A1 | 8/2004 | Gimson |
| 2004/0168522 A1 | 9/2004 | Fernald et al. |
| 2004/0210404 A1 | 10/2004 | Gysling et al. |
| 2004/0231431 A1 | 11/2004 | Sullivan et al. |
| 2004/0255695 A1 | 12/2004 | Gysling et al. |
| 2005/0011284 A1 | 1/2005 | Gysling et al. |

FOREIGN PATENT DOCUMENTS

| | | |
|---|---|---|
| WO | WO 99/67629 | 12/1999 |
| WO | WO 0000793 | 1/2000 |
| WO | WO 0102810 | 1/2001 |

OTHER PUBLICATIONS

"Two Decades of Array Signal Processing Research", The Parametric Approach, H. Krim and M. Viberg, IEEE Signal Processing Magazine, Jul. 1996, pp. 67-94.

"Development of an array of pressure sensors with PVDF film, Experiments in Fluids 26", Jan. 8, 1999, Springer-Verlag.

"Viscous Attenuation of Acoustic Waves in Suspensions" by R.L. Gibson, Jr. and M.N. Toksoz.

"Sonar-Based Volumetric Flow Meter for Pulp and Paper Applications" by: Daniel L. Gysling and Douglas H. Loose—Dec. 3, 2002.

Sonar-Based Volumetric Flow Meter for Chemical and Petrochemical Applications by: Daniel L. Gysling and Douglas H. Loose—Feb. 14, 2003.

"New Flowmeter Principle" by: Walt Boyes—Oct. 2003 Issue of Flow Control Magazine.

* cited by examiner

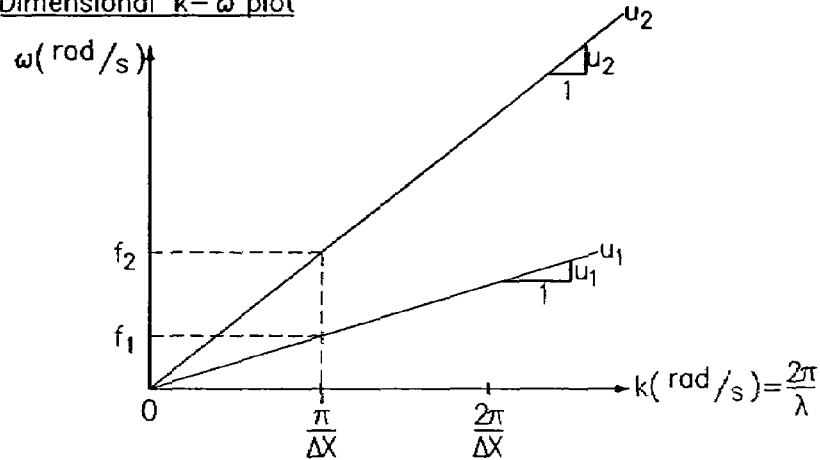
FIG. 8(a)
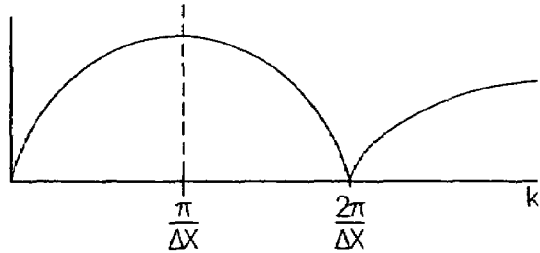
FIG. 8(b)
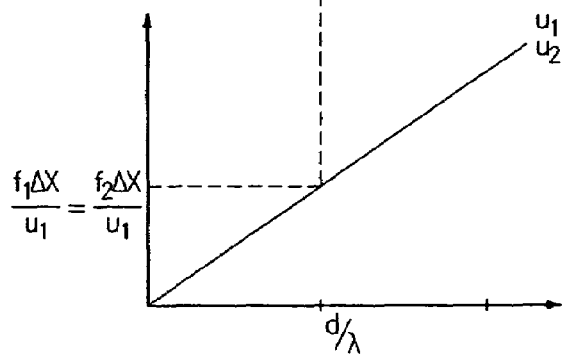
FIG. 8(c)
FIG. 8

METHOD FOR CALIBRATING A VOLUMETRIC FLOW METER HAVING AN ARRAY OF SENSORS

CROSS-REFERENCE TO RELATED PATENT APPLICATIONS

This application is a continuation patent application of U.S. patent application Ser. No. 10/720,599, filed Nov. 24, 2003; now U.S. Pat. No. 7,139,667 which claimed the benefit to U.S. provisional patent application Ser. No. 60/428,312, filed Nov. 22, 2002; U.S. provisional patent application Ser. No. 60/510,765, filed Oct. 9, 2003; and U.S. provisional patent application Ser. No. 60/511,399, filed Oct. 15, 2003, which are all hereby incorporated by reference in their entirety.

BACKGROUND OF THE INVENTION

1. Field of the Invention

The present invention relates to flow meters; and more particularly to a method and apparatus for calibrating a flow meter having an array of sensors arranged in relation to a pipe that measures a flow rate of a fluid flowing in the pipe.

2. Description of the Related Art

Volumetric flow measurement plays a critical role in process optimization and control of most industrial processes. The current industrial flow measurement market is often segmented into two broad technology categories: old technology and new technology flow meters. Old technology flow meters include flow measurement technologies that have been in used for greater than 70 years and include turbine meters, orifice plates and variable area flow meters. The new technology flow meters have emerged over the last 30~50 years and offer advantages over the old technologies in performance, functionality, and reliability. The major types of new technology flow meters include ultrasonic meters, electromagnetic flow meters, vortex flow meters, and coriolis flow meters. Each type has evolved to serve various aspects of the diverse range of applications within the industrial flow meter landscape. For example, the electromagnetic flow meter has emerged as the dominate type of flow meter used in the paper and pulp industry.

In particular, flow meters having an array of sensors arranged in relation to a pipe that measure a flow rate of a fluid flowing in the pipe are known in the art. For example, U.S. Pat. No. 6,609,069, which is incorporated by reference, discloses a method and apparatus for determining the flow velocity of fluid within a pipe, such as an oil pipe.

One problem with flow meters in the art is that, despite the fact that they are calibrated to measure a flow rate of a given fluid(s) flowing in a given pipe(s), this calibration may not be correct when the flow meter is used in the field to measure different types of fluids flowing, for example, in different types of pipes than those in which the flow meter was originally calibrated to measure fluid flow. For example, the original calibration is likely to provide an incorrect measurement when the flow meter is used in relation to a fluid having a different density or viscosity than it was originally calibrated, or when the flow meter is used in relation to a pipe having a different wall thickness or inner diameter than it was originally calibrated, or when the array of sensors are spaced differently in relation to the pipe than it was originally calibrated. In view of this, the known flow meters are likely to have an error in their measurement, for which no correction is made. Moreover, the known flow meters are not designed to correct the original calibration based on one or more parameters that characterize either the array of sensors, the pipe, the fluid flowing in the pipe, or some combination thereof.

There is a need in the prior art for a flow meter that can be calibrated in the field based on receiving such parameters.

SUMMARY OF THE INVENTION

The present invention provides a new and unique method and apparatus for calibrating a flow meter having an array of sensors arranged in relation to a pipe that measures a flow rate of a fluid flowing in the pipe. The method features the step of calibrating the flow rate using a calibration correction function based on one or more parameters that characterize either the array of sensors, the pipe, the fluid flowing in the pipe, or some combination thereof. The calibration correction function depends on either a ratio t/D of the pipe wall thickness (t) and the pipe inner diameter (D); a Reynolds number ($\rho UD/\mu$) that characterizes the fluid flow in the pipe; a ratio $\Delta x/D$ of the sensor spacing ($\Delta x$) and the pipe inner diameter (D); a ratio $f\Delta x/U_{meas}$ of usable frequencies in relation to the sensor spacing ($\Delta x$) and the raw flow rate ($U_{meas}$); or some combination thereof. The apparatus takes the form of a flow meter having a calibration correction function module performing the aforementioned functionality.

The Reynolds number (Re), based on pipe diameter (D), characterizes many of the engineering properties of the flow. The Reynolds number is a non-dimensional ratio representing the relative importance of inertial forces to viscous forces within a flow:

$$Re = \frac{\text{inertial}}{\text{viscous}} \text{forces} = \frac{\rho u \frac{\partial u}{\partial x}}{\mu \frac{\partial^2 u}{\partial y^2}} = \frac{UD}{v}$$

Where $\rho$ is the fluid density, $\mu$ is the dynamic viscosity, U is the volumetrically averaged flow velocity and v ($=\mu/\rho$) is the kinematic viscosity. The critical Reynolds number for pipe flows, above which flows are considered turbulent, is ~2,300. Most flows in the paper and pulp industry have Reynolds number ranging from one hundred thousand to several million, well within the turbulent regime. In addition to demarcating a boundary between laminar and turbulent flow regimes, the Reynolds number is a similarity parameter for pipe flows, i.e. flows in geometrically similar pipes with the same Reynolds number are dynamically similar.

The flow rate being calibrated may include a volumetric flow rate (Q) or a velocity of flow. In operation, the volumetric flow rate (Q) is determined based on the equation:

$$Q = A * U_{av},$$

where A is a cross sectional area of the pipe's inner diameter and $U_{av}$ is an average flow velocity.

The average flow velocity ($U_{av}$) is determined based on the equation:

$$U_{av} = \text{the calibration correction function} * U_{meas},$$

where $U_{means}$ is a measured flow rate.

The velocity of flow is determined by using a K-ω plot.

The array of sensors includes an array of pressure sensors, as well as an array of strain or temperature sensors.

One advantage of the present invention is that the flow meter according to the present invention can be calibrated in the field based on receiving the one or more parameters that characterize either the array of sensors, the pipe, the fluid flowing in the pipe, or some combination thereof.

Another advantage of the present invention is that the flow meter according to the present invention provides a more accurate measurement after being calibrated in the field.

Still another advantage of the present invention is that the flow meter according to the present invention can be designed and used in relation to a class of pipes, such as Sch 10 or 40, and calibrated in the field based on a family of calibration curves.

In one particular application of the present invention relates to providing a new flow measurement technology well-suited for the paper and pulp industry. The present invention provides robust, high-accuracy, volumetric flow rate measurement for a broad range of single and multiphase flows. The present invention can be implemented with ported pressure transducers or with non-intrusive sensors clamped-on to existing process piping. This first-principles flow measurement methodology utilizes an array of sensors to listen to the unsteady pressure field within standard process flow lines. Sonar array processing techniques are employed to track the speed at which coherent structures, inherent within the turbulent pipe flow of the process fluid, convect past the sensor array. The present invention results in a meter performance on paper and pulp slurries ranging from 0-5% pulp. Results from a single phase calibration facility are also presented demonstrating 0.5% accuracy for pipes ranging from 3 to 16 inches in diameter.

BRIEF DESCRIPTION OF THE DRAWINGS

FIG. 8, including FIGS. 8a, 8b, 8c, show . . . .

BEST MODE FOR CARRYING OUT THE INVENTION

Figure 1:
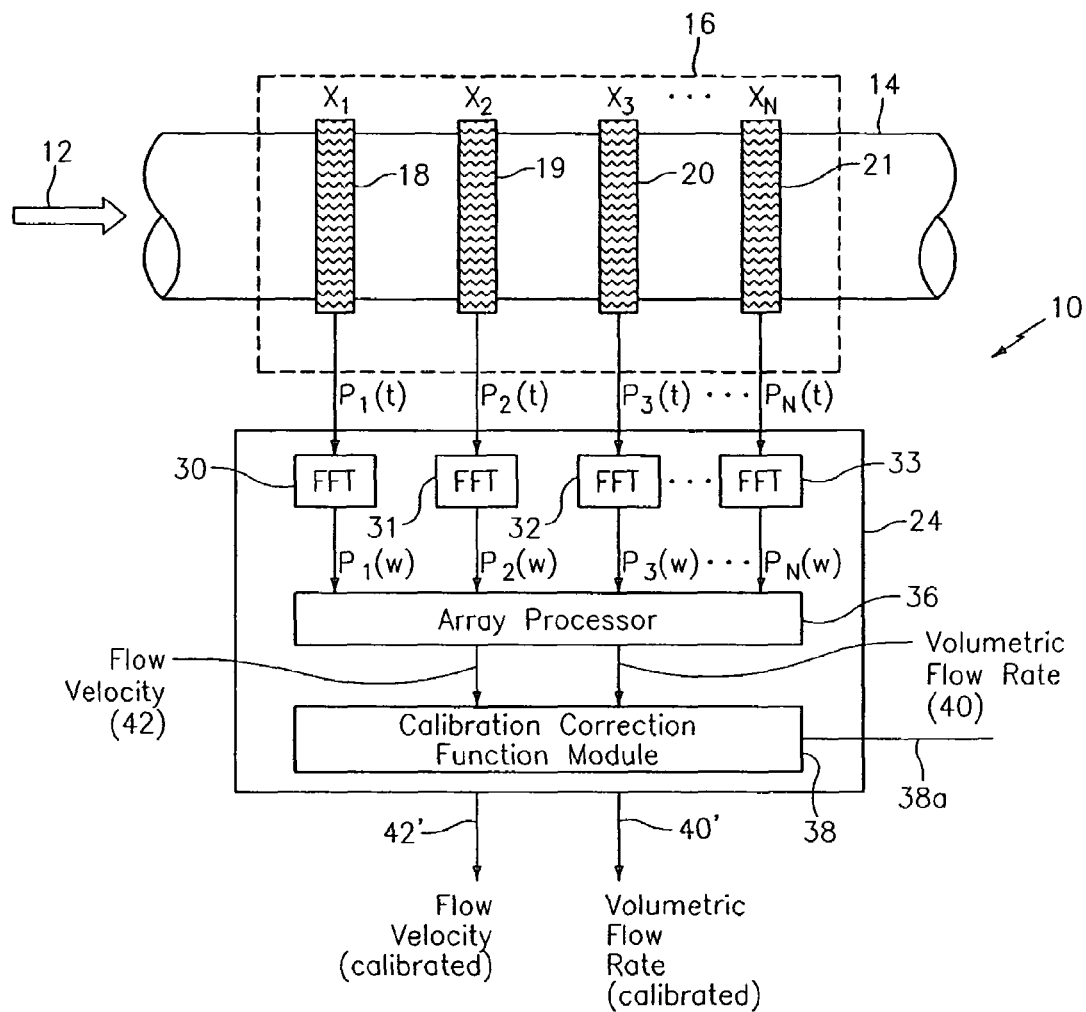
FIG. 1 is a block diagram of a flow meter having an array of sensors disposed axially along a pipe for measuring the volumetric flow of the process flow flowing in the pipe, in accordance with the present invention.
Figure 2:
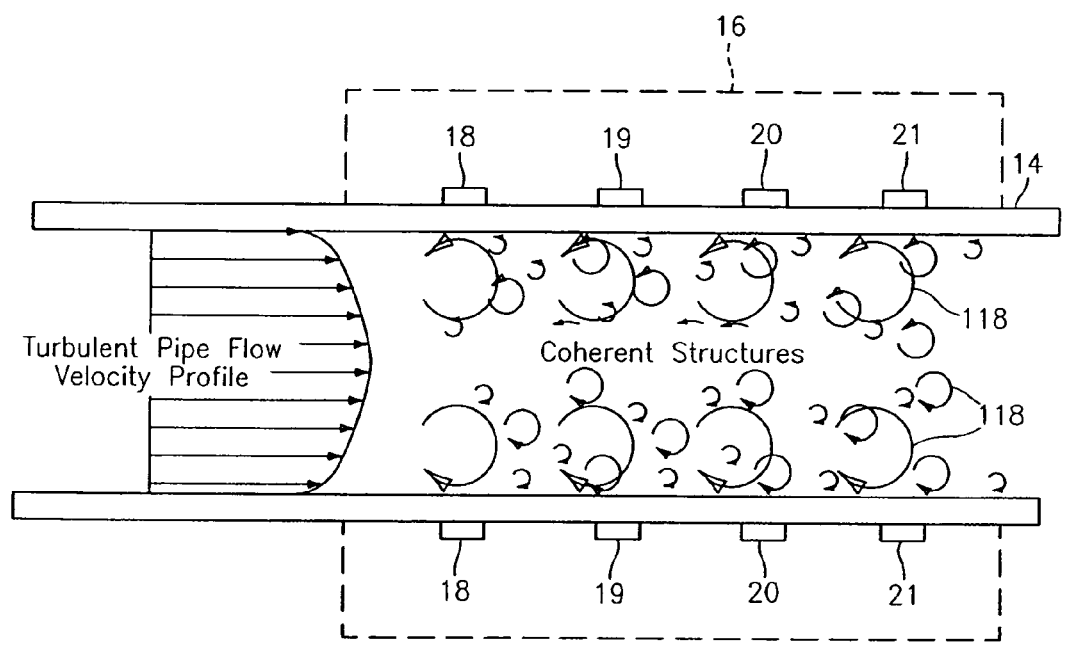
FIG. 2 is a cross-sectional view of a pipe with fluid flowing therein having an array of pressure sensors disposed axially along the pipe, in accordance with the present invention.

FIGS. 1 and 2 show a flow meter generally shown as 10 that measures the flow rate, including the volumetric flow rate and flow velocity, of a single phase fluid 12 (e.g., gas and liquid) and/or a multi-phase mixture 12 (e.g., process flow) flowing through a pipe 14 shown in FIG. 2. The multi-phase mixture may be a two-phase liquid/vapor mixture, a solid/vapor mixture or a solid/liquid mixture, gas entrained liquid or a three-phase mixture. The scope of the invention is not intended to be limited to the type or kind of fluid, flow, media or mixture being measured by the flow meter 10, or the type or kind of the pipe 14 in which the fluid, flow, media or mixture is flowing.

The flow meter 10 includes a sensing device 16 comprising an array of pressure sensors (or transducers) 18-21 spaced axially along the outer surface 22 of the pipe 14 (FIG. 2), having a process flow 12 propagating therein. The pressure sensors 18-21 measure the unsteady pressures produced by vortical disturbances 118 (FIG. 2) within the pipe 14, which are indicative of the velocity of the process flow 12. The output signals ($P_1(t)$-$P_N(t)$) may be conditioned in one or more ways, including amplified and/or converted in an analog-to-digital (A/D) converter, although the scope of the invention is not intended to be limited to any such conditioning.

The output signals ($P_1(t)$-$P_N(t)$) of the pressure sensors 18-21 are then provided to a processor 24, which processes the pressure measurement data to determine the volumetric flow rate and flow velocity. The measurements are derive by the processor 24 by interpreting the unsteady pressure field within the process piping using multiple transducers/sensors displaced axially over about 2 diameters in length. The processor 24, including the modules and functionality described herein, may be implemented using hardware, software or a combination thereof. One software embodiment envisioned comprises, among other things, a microprocessor based architecture having a microprocessor, memory, input/output devices and address and data bus coupling the same. A person skilled in the art would be able to implement the processor 24 without undue experimentation. The flow measurements can be performed using ported pressure transducers or clamp-on, strain-based sensors.

The flow meter 10 measures the volumetric flow rate by determining the velocity of vortical disturbances or "eddies" 118 (FIG. 2) propagating through the flow 12 using the array of pressure sensors 18-21. Similar to that shown in U.S. patent application Ser. No. 10/007,736 filed Nov. 8, 2001. The flow meter 10 measures the velocities associated with unsteady flow fields and/or pressure disturbances created by the vortical disturbances or "eddies" 118 to determine the velocity of the flow 12. The pressure sensors 18-21 measure the unsteady pressures $P_1(t)$-$P_N(t)$ created by the vortical disturbances 118 as these disturbances convect within the flow 12 through the pipe 14 in a known manner. Therefore, the velocity of these vortical disturbances 118 is related to the velocity of the flow 12 and hence the volumetric flow rate may be determined, as will be described in greater detail hereinafter.

The Pressure Sensors 18-21

In FIG. 1, each of the pressure sensors 18-21 may include a piezoelectric film sensor to measure the unsteady pressures of the flow 12. The piezoelectric film sensors include a piezoelectric material or film to generate an electrical signal proportional to the degree that the material is mechanically deformed or stressed. The piezoelectric sensing element is typically conformed to allow complete or nearly complete circumferential measurement of induced strain to provide a circumferential-averaged pressure signal. The sensors can be formed from PVDF films, co-polymer films, or flexible PZT sensors, similar to that described in "Piezo Film Sensors Technical Manual" provided by Measurement Specialties, Inc., which is incorporated herein by reference. A piezoelectric film sensor that may be used for the present invention is part number 1-1002405-0, LDT4-028K, manufactured by Measurement Specialties, Inc.

Piezoelectric film ("piezofilm"), like piezoelectric material, is a dynamic material that develops an electrical charge proportional to a change in mechanical stress. Consequently, the piezoelectric material measures the strain induced within the pipe 14 due to unsteady pressure variations (e.g., vortical disturbances) within the process flow 12. Strain within the pipe is transduced to an output voltage or current by the attached piezoelectric sensor. The piezoelectrical material or film may be formed of a polymer, such as polarized fluoropolymer, polyvinylidene fluoride (PVDF). The piezoelectric film sensors are similar to that described in U.S. patent application Ser. No. 10/712,833 which is incorporated herein by reference.

The scope of the invention is not intended to be limited to the kind or type of pressure sensors 18-21.

The Measurement of Volumetric Flow

To measure volumetric flow, the flow meter 10 characterizes the velocity at which the coherent vortical structures 118 convect past the axial array of sensors 18-21. Coherent structures 118 are an inherent feature of turbulent boundary layers present in all turbulent flows. Unlike conventional vortex shedding meters, no internal geometry is required to generate these structures.

The overwhelming majority of industrial process flows involve turbulent flow 12. Turbulent fluctuations within the process flow govern many of the flow properties of practical interest including the pressure drop, heat transfer, and mixing. For engineering applications, considering only the time-averaged properties of turbulent flows is often sufficient for design purposes. For sonar based array processing flow metering technology, understanding the time-averaged velocity profile in turbulent flow 12 provides a means to interpret the relationship between speed at which the coherent structures 118 convect and the volumetrically averaged flow rate.

Turbulent pipe flows 12 are highly complex flows. Predicting the details of any turbulent flow is problematic, however, much is known regarding the statistical properties of the flow. The maximum length scale of the eddies 118 is set by the diameter of the pipe 14. These structures 118 remain coherent for several pipe diameters downstream, eventually breaking down into progressively smaller eddies until the energy is dissipated by viscous effects.

Experimental investigations have established that eddies generated within turbulent boundary layers convect at roughly 80% of maximum flow velocity. For pipe flows, this implies that turbulent eddies will convect at approximately the volumetrically averaged flow velocity within the pipe 14. The precise relationship between the convection speed of the turbulent eddies 118 and the flow rate for each class of meters can be calibrated empirically as described below.

In FIG. 2, the relevant flow features of the turbulent pipe flow 12 are illustrated along with the axial array of sensors 18-21. As shown, the time-averaged axial velocity is a function of radial position, from zero at the wall to a maximum at the centerline of the pipe. The flow 12 near the wall is characterized by steep velocity gradients and transitions to relatively uniform core flow near the center of the pipe 14. Vortical structures 118 are superimposed over time averaged velocity profile. These coherent structures contain temporally and spatially random fluctuations with magnitudes typically less than 10% percent of the mean flow velocity and are carried along with the mean flow. Experimental investigations have established that the eddies 118 generated within turbulent boundary layers remain coherent for several pipe diameters and convect at roughly 80% of maximum flow velocity.

From a volumetric flow measurement perspective, the volumetrically averaged flow velocity is of interest. The volumetrically averaged flow velocity, defined as the total volumetric flow rate, Q, divided by the cross sectional area of the conduit, A, is a useful, but arbitrarily defined property of the flow. In fact, given the velocity profile within the pipe, little flow is actually moving at this speed. The precise relationship between the convection speed of turbulent eddies and the flow rate is determined experimentally through calibration for each.

The Calibration Correction Module 38

The processor 24 includes a calibration correction function module 38 for calibrating the flow rate using a calibration correction function based on one or more parameters that characterize either the array of sensors 18-21, the pipe 14, the fluid 12 flowing in the pipe 14, or some combination thereof. The calibration correction function depends on either a ratio t/D of the pipe wall thickness (t) and the pipe inner diameter (D); a Reynolds number ($\rho UD/\mu$) that characterizes the fluid flow in the pipe; a ratio $\Delta x/D$ of the sensor spacing ($\Delta x$) and the pipe inner diameter (D); a ratio $f\Delta x/U_{means}$ of usable frequencies in relation to the sensor spacing ($\Delta x$) and the raw flow rate ($U_{meas}$); or some combination thereof.

The Reynolds number, based on pipe diameter, characterizes many of the engineering properties of the flow. The Reynolds number is a non-dimensional ratio representing the relative importance of inertial forces to viscous forces within a flow:

$$Re = \frac{\text{inertial}}{\text{viscous}} \text{forces} = \frac{\rho u \frac{\partial u}{\partial x}}{\mu \frac{\partial^2 u}{\partial y^2}} = \frac{UD}{v}$$

Where $\rho$ is the fluid density, $\mu$ is the dynamic viscosity, U is the volumetrically averaged flow velocity and v ($=\mu/\rho$) is the kinematic viscosity. Pipe flows with Reynolds numbers exceeding a critical value, typically ~2300, are turbulent. Those with Reynolds numbers below this value are laminar.

The calibration correction function module 38 may be implemented using hardware, software or a combination thereof. One software embodiment envisioned comprises, among other things, a microprocessor based architecture having a microprocessor, memory, input/output devices and address and data bus coupling the same. A person skilled in the art would be able to implement the calibration correction function module 38 without undue experimentation.

The flow rate includes a volumetric flow rate (Q) and the calibration correction function module 38 determines the volumetric flow rate (Q) indicated as 40' based on the equation:

$$Q = A * U_{av}$$

where A is a cross sectional area of the pipe's inner diameter and $U_{av}$ is an average flow velocity. The average flow velocity ($U_{av}$) is determined based on the equation:

$$U_{av} = \text{the calibration correction function} * U_{meas},$$

where $U_{meas}$ is a measured flow rate.

The Reynolds number $\rho U D / \mu$ is defined by a ratio of the fluid density ($\rho$), the volumetrically averaged flow velocity (U) and the pipe inner diameter (D) in relation to the dynamic viscosity of the fluid ($\mu$).

The calibration correction function module 38 also may receive as inputs one or more parameters via line 38a, consistent with that discussed below.

Figure 3:
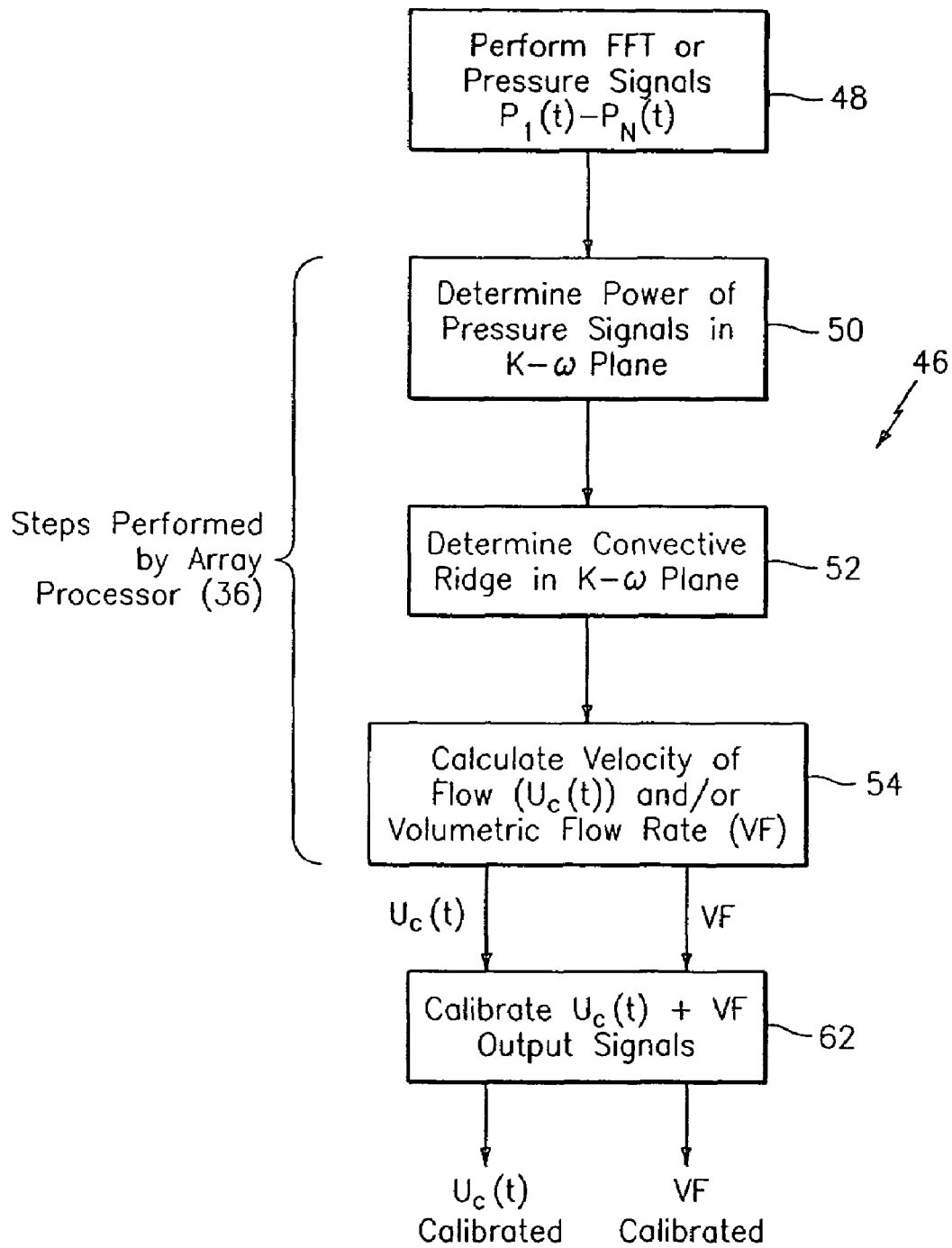
FIG. 3 is a flow chart illustrative of the algorithm of the signal processor, in accordance with the present invention.

FIG. 3: The Basic Steps

FIG. 3 shows the basic steps generally indicated as 46 performed by the processor 24 in FIG. 1, including a step 48 for performing an FFT of pressure signals $P_1(t)$-$P_N(t)$; a step 50 for determining power of the pressure signals in a K-ω plane; a step 52 for determining a convective ridge in the K-ω plane; a step 54 for calculating velocity of flow (Vc(t)) and/or volumetric flow (VF); and a step 62 for calibrating the velocity of flow (Vc(t) and/or volumetric flow (VF). The step 48 is performed by the FFT modules 30-33; the steps 50, 52, 54 are performed by the array processor 36 and the step 62 is performed by the calibration correction function module 38.

In FIG. 1, the flow meter 10 has an array of at least three acoustic pressure sensors 18-21, located at three locations $x_1$, $X_2$, $X_3$ axially along the pipe 14. One will appreciate that the sensor array may include more than three pressure sensors as depicted by pressure sensor 21 at location $X_N$. For example, the array of sensors may include at least 4, 5, 6, 7, 8, 9, 10, 11, 12, 13, 14, 15, or 16 sensors. The pressure generated by the vortical disturbances 118 may be measured through pressure sensors 18-21. The pressure sensors provide pressure time-varying signals $P_1(t)$, $P_2(t)$, $P_3(t)$, $P_N(t)$ to a signal processor 24 to known Fast Fourier Transform (FFT) logics 30-33, respectively. The FFT logics 30-33 calculate the Fourier transform of the tune-based input signals $P_1(t)$-$P_N(t)$ and provide complex frequency domain (or frequency based) signals $P_1(\omega)$ $P_2(\omega)$, $P_3(\omega)$, $P_N(\omega)$ indicative of the frequency content of the input signals. Instead of FFT's, any other technique for obtaining the frequency domain characteristics of the signals $P_1(t)$-$P_N(t)$ may be used.

The frequency signals $P_1(\omega)$-$P_N(\omega)$ are fed to an array processor 36, which provides a flow signal 40 indicative of the volumetric flow rate of the process flow 12 and a velocity signal 42 indicative of the velocity of the process flow.

One technique of determining the convection velocity of the vortical disturbances 118 within the process flow 12 is by characterizing the convective ridge of the vortical disturbances using an array of unsteady pressure sensors or other beam forming techniques, similar to that shown in U.S. Pat. No. 6,609,069, entitled "Method and Apparatus for Determining the Flow Velocity Within a Pipe", which is incorporated herein by reference.

The flow metering methodology uses the convection velocity of coherent structure with turbulent pipe flows 12 to determine the volumetric flow rate. The convection velocity of these eddies 118 is determined by applying arraying processing techniques to determine the speed at which the eddies convect past an axial array of unsteady pressure measurements distributed along the pipe 14, similar to that used in the radar and sonar fields.

The array processing algorithms determine the speed of the eddies 118 by characterizing both the temporal and spatially frequency characteristics of the flow field. For a series of coherent eddies convecting past a fixed array of sensors, the temporal and spatial frequency content of pressure fluctuations are related through the following relationship:

$$k = \frac{\omega}{U_{convect}}$$

Here k is the wave number, defined as $k=2\pi/\lambda$ and has units of 1/length, ω is the temporal frequency in rad/sec, and $U_{convect}$ is the convection velocity. Thus, the shorter the wavelength (larger k) is, the higher the temporal frequency.

In array processing, the spatial/temporal frequency content of time stationary sound fields are often displayed using "k-ω plots". K-ω plots are essentially three-dimensional power spectra in which the power of a sound field is decomposed into bins corresponding to specific spatial wave numbers and temporal frequencies. On a K-ω plot, the power associated with a pressure field convecting with the flow is distributed in regions, which satisfies the dispersion relationship developed above. This region is termed "the convective ridge" and the slope of this ridge on a K-ω plot indicates the convective velocity of the pressure field. This suggests that the convective velocity of turbulent eddies, and hence flow rate within a pipe, can be determined from the output of a phased array of sensor and identifying the slope of the convective ridge within the K-ω plane.

Figure 4:
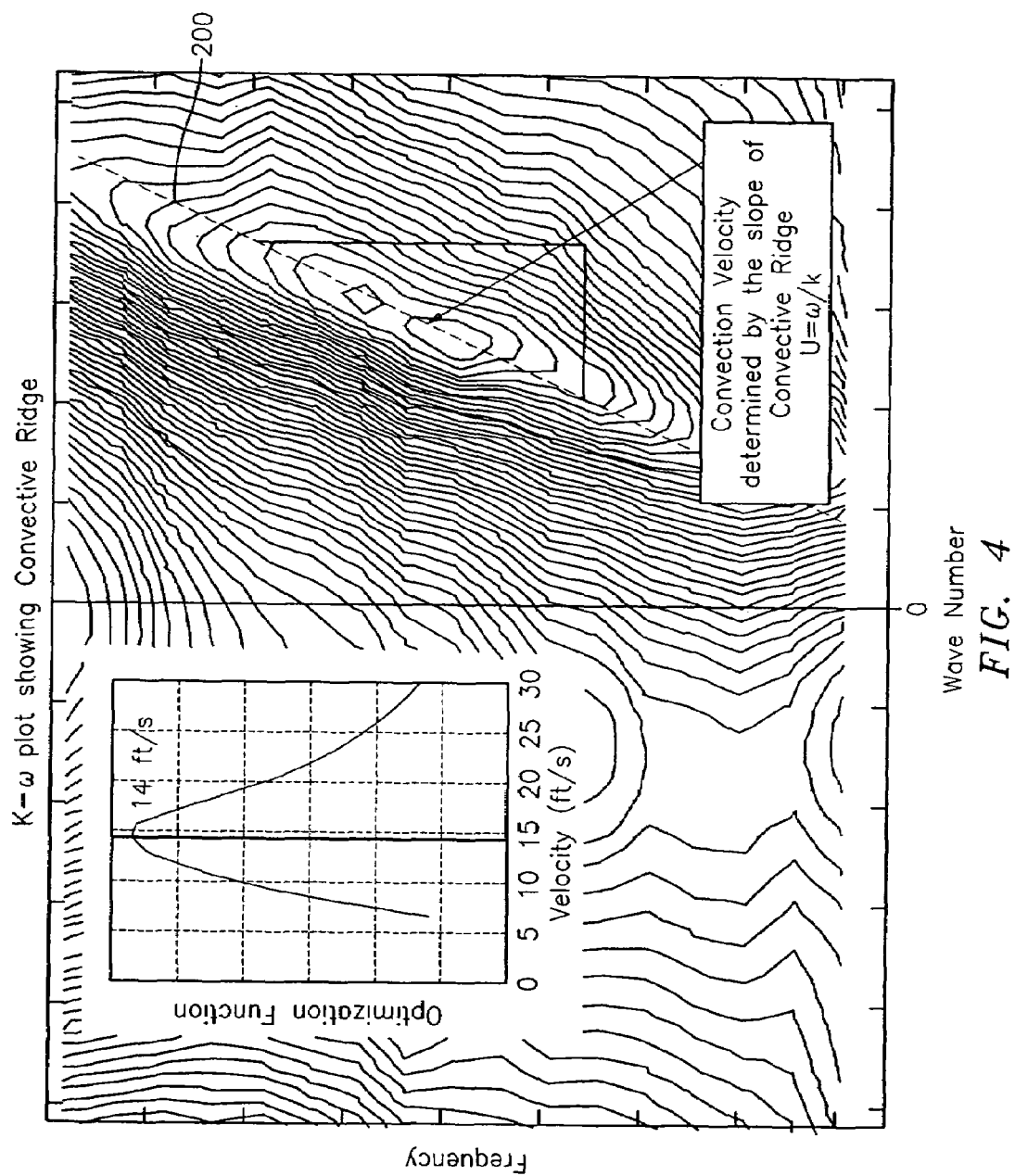
FIG. 4 is a k-w plot showing a convective ridge illustrative of the convective flow within the pipe, in accordance with the present invention.

FIG. 4: The K-ω plot

FIG. 4 shows an example of a K-ω plot generated from a phased array of pressure sensors 18-21. The power contours show a well-defined convective ridge. A parametric optimization method was used to determine the "best" line representing the slope of the convective ridge 200. For this case, a slope of 14.2 ft/sec was determined. The intermediate result of the optimization procedure is displayed in the insert, showing that optimized value is a unique and well-defined optima.

The K-ω plot shown in FIG. 4 illustrates the fundamental principle behind sonar based flow measure, namely that axial arrays of sensors can be used in conjunction with sonar array processing techniques to determine the speed at which naturally occurring turbulent eddies convect within a pipe.

The Volumetric Flow Rate

The volumetric flow rate for a given pipe is defined as follows:

$$Q = A \cdot U_{av}$$

Where:
A=Cross sectional area of the pipe's inner diameter
$U_{av}$=Average velocity of the flow profile within the pipe As described herein before, the average velocity is defined as follows:

$$U_{av} = f\left\{\frac{t}{D}; \frac{\rho UD}{\mu}; \frac{\Delta x}{D}; \frac{f\Delta x}{U_{meas}}\right\} \cdot U_{meas}$$

Where:

$U_{meas}$ = raw flow rate as determined by the algorithm $f\{\ \}$ = calibration correction function $\frac{t}{D}$ = ratio of pipe wall thickness(t) and pipe inner diameter(D)

$\frac{\rho UD}{\mu}$ = Reynolds Number $\frac{\Delta x}{D}$ = dependence on the ratio of sensor spacing($\Delta x$) and the inner diameter of the pipe(D)

Figure 5:
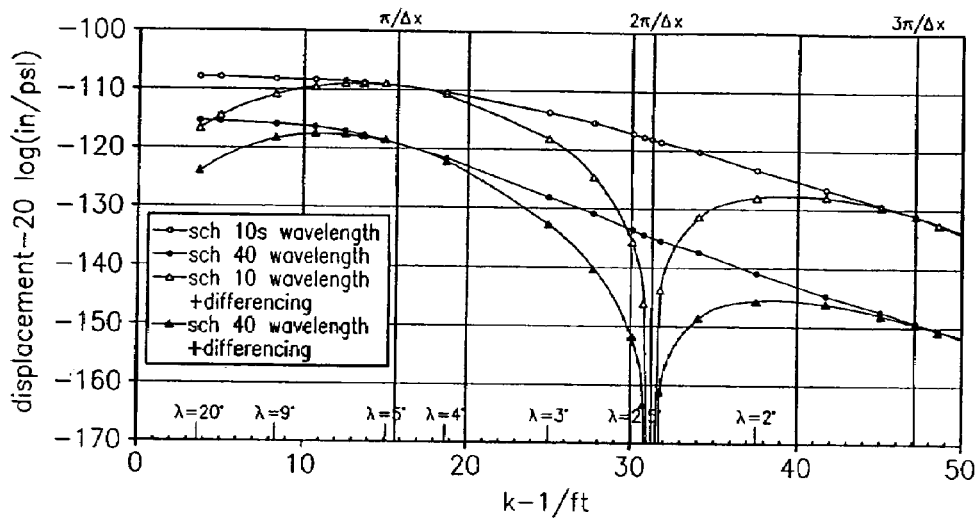
FIG. 5 is a graph of an attenuation profile showing a dependence of a ratio of the pipe wall thickness (t) in relation to the pipe inner diameter (D).
Figure 6:
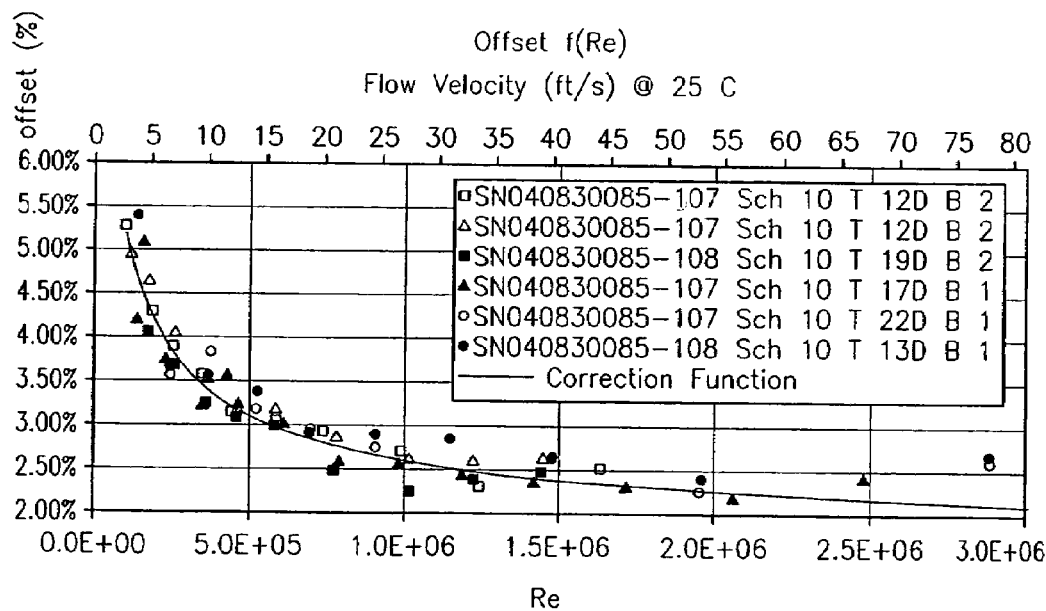
FIG. 6 is a graph showing a dependence of the Reynolds number (Re) in relation to an offset (%) of the flow velocity.
Figure 7:
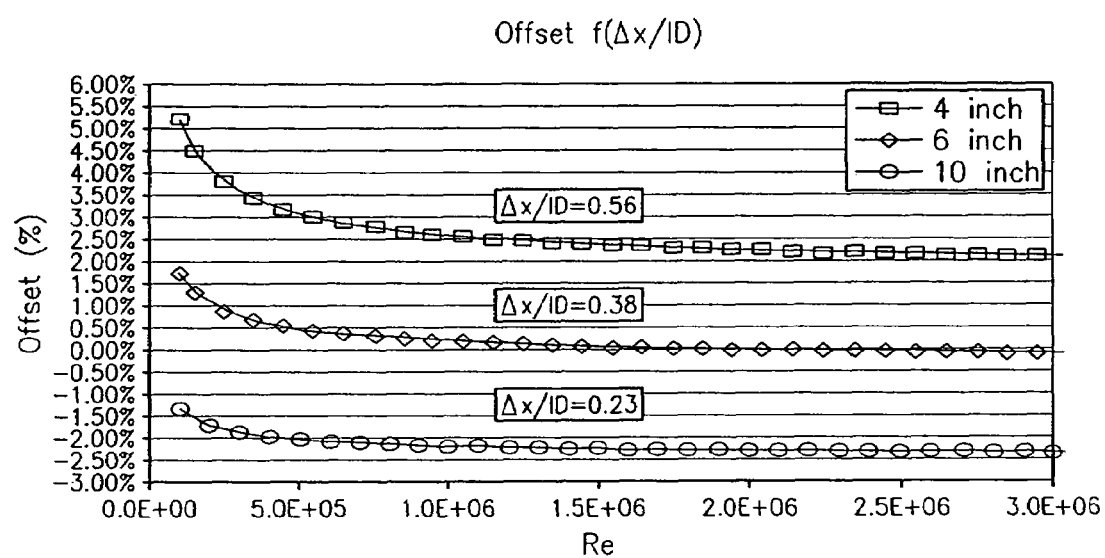
FIG. 7 is a graph of the Reynolds number (Re) in relation to an offset (%) of the flow velocity showing a dependence of the sensor spacing and inner pipe diameter.

$\frac{f\Delta x}{U_{meas}}$ = dependence on the useable frequencies($f$) within the array response FIGS. 5-7 provide graphs of empirical testing that has been conducted to determine the correction function dependence on each of the contributing parameters.

FIG. 5: The Pipe Wall Thickness (t) to Pipe Inner Diameter (D) Dependence

FIG. 5 shows a graph indicating an attenuation profile in relation to the dependence of the pipe wall thickness (t) to pipe inner diameter (D). In effect, the unsteady pressure fluctuations created by the convecting field of eddies strain the pipe at a corresponding set of frequencies. These are proportional to the wavelength of the eddies. The pipe wall acts as an attenuator and will decrease the signal power as a function of the wall thickness and frequency.

The Attenuation Characteristics

The attenuation characteristics of the pipe wall change as a function of the ratio of the wall thickness to the inner diameter.

FIG. 6: The Reynolds Number Dependence

FIG. 6 shows the measured velocity of the flow is a function of the Reynolds Number. The graph provides a set of empirical data demonstrating this effect: The Reynolds Number effects the velocity profile and therefore the distribution of the velocity across the diameter of the pipe.

FIG. 7: The Sensor Spacing to Pipe Inner Diameter (D) Dependence

FIG. 7 is a graph of empirical data showing the dependence between the sensor spacing ($\Delta x$) and pipe inner diameter (D). In effect, the sensor spacing ($\Delta x$) defines the wavelength, or alternatively the wave number, of the signals to be measured through the dispersion relationship. This establishes the size of the vortical signals that can be measured. The convective velocity of this set of vorticals has a unique relationship to the average volumetric flow rate.

The Dependence of Usable Frequencies within the Array Response

The sensor spacing $\Delta x$ defines the wavelength, or alternatively the wave number, of the signals to be measured through the dispersion relationship. The $$\frac{f\Delta x}{U_{meas}}$$

ratio defines which of the measurable wavelengths should be used at a given flow rate. For the previously described empirical testing, the minimum and maximum values were set to 0.3 and 0.7 respectively.

FIG. 8a shows a dimensional K-ω plot; FIG. 8b shows an array gain; and FIG. 8c shows a non-dimensional K-ω plot.

Using the parameter f$\Delta$x/U where f is the frequency in Hz (f=$_\omega$/(2$\pi$) where $_\omega$ is the frequency in rad/sec) enables the k-$_\omega$ plot to be non-dimensionalized. This results in the ability to use the same region of the array gain function regardless of the velocity. This same region is preferably centered about the point of maximum array response ($\pi$/$\Delta$k) of the array gain function. (For example, per the attached figure the maximum array response occurs at k=$\pi$/$\Delta$x. Keeping in mind the dispersion relationship k=$_\omega$/u=2$\pi$f/u the maximum array response will occur at different frequencies for different velocities. That is, for an array with $\Delta$x=0.2 feet at 3 ft/sec velocity the maximum array response will occur at 3$\pi$/$\Delta$x=47.1 rad/sec where at 10 ft/sec velocity the maximum response will occur 10$\pi$/$\Delta$x=157 rad/sec. If the frequency is non-dimensionalized in this manner, the maximum array response will always occur at f$\Delta$x/u=0.5 regardless of the velocity. The advantage of this non-dimensionalization is that regardless of the velocity, the section of the k-$_\omega$ plot that yields the maximum array response can be identified and used.

Referring to step 62 of FIG. 3, knowing the calibration function and the relationship of each of the factors in the calibration function, the measured velocity of the flow Uc(t) and measured volumetric flow (VF) signals may be calibrated knowing the actual or empirical relationship of each of the relationships of the calibration function to provide a more accurate flow velocity Uc(t) and volumetric flow (VF).

FIG. 9

Figure 9:
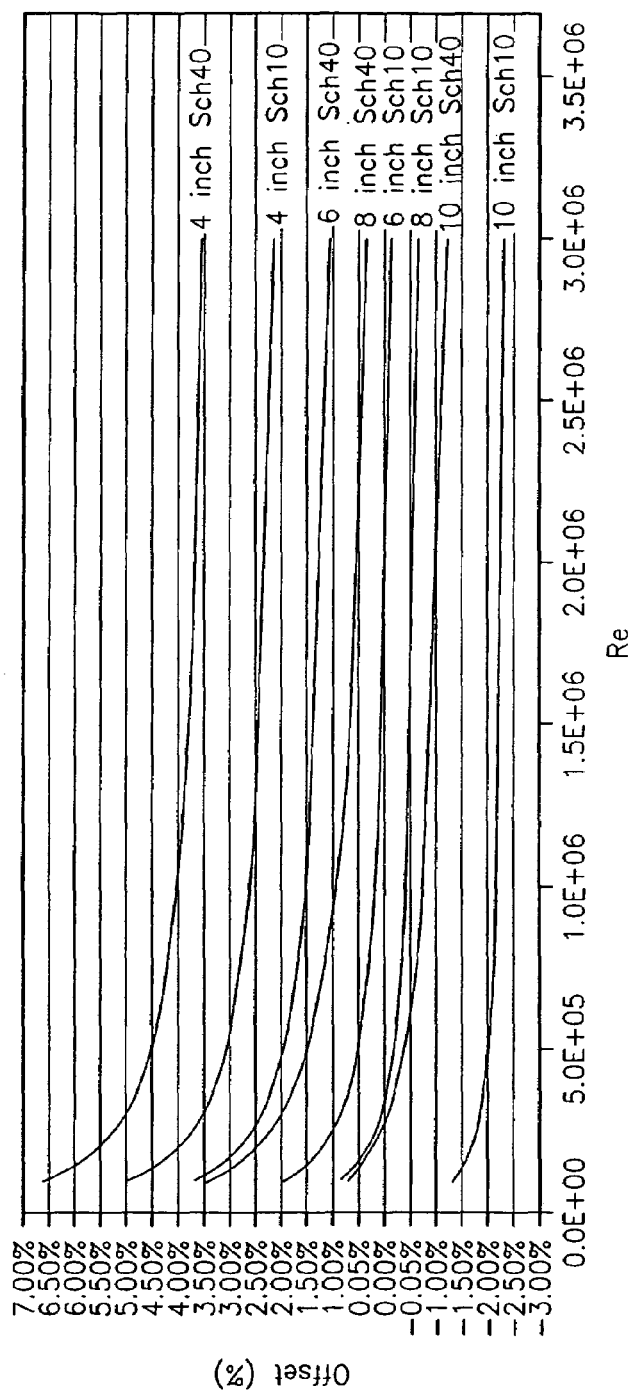
FIG. 9 is a graph of the Reynolds number (Re) in relation to an offset (%) of the flow velocity in the form of a family of calibration curves.

FIG. 9 illustrates empirical data representative of a family of calibration curves for a plurality of classes of flow meter of the present invention, described herein before, used to calibrate each respective class of meter. Each class of meter is represented or defined by the pipe that the flow meter is measuring. For example, one class is represented by a 4 inch ID, schedule 10 that is represented by the calibration curve 100. Each calibration curve using empirical data collected for a particular class of flow meters is defined by the equation $C_0+C_1/Re^{C_2}$ (Correction Function), wherein each class have a unique value for each of the coefficients $C_0$, $C_1$ and $C_2$. Re is the Reynolds number of the flow propagating through the pipe. The Calibration Curves are defined by Percent Error or Offset versus the Reynolds number of the fluid, which is related to the velocity of the fluid flow as shown in FIG. 9. For example, $V_{corrected}=V_{measured}/(\text{Offset}+1)$, the Offset=$C_0+C_1/RE^{C_2}$, and Re=$0.00774\times\rho\times V\times ID/\mu$, where 0.007742=Combined conversion factor V (ft/s to m/s) and ID(in to m).

Each calibration curve includes all the factors or terms of the calibration correction function described hereinbefore. All meters within the same class are calibrated using the same calibration curve, defined by the correction function.

As shown in FIG. 9, the measured velocity is corrected in accordance with the corresponding calibration curve. For example, the measured output velocity for a meter mounted to a 4 inch ID, 40 schedule pipe having a flow with a Reynolds number of 5.0E+05 is corrected for a 4.50% offset.

Each sensor head includes 3 numbers representative of each of the three coefficients C0, C1 and C2 of the "Correction Function". These calibration numbers are pre-programmed, or entered into the processor 24 via line 38a, for example, to calibrate the flow meter 10. This enables any sensor head 16 of a different classes to be used with any processor 24. Therefore the processor 24 are independent of the pipes being measured.

The pressure sensors 18-21 of FIG. 1 described herein may be any type of pressure sensor, capable of measuring the unsteady (or ac or dynamic) pressures within a pipe 14, such as piezoelectric, optical, capacitive, resistive (e.g., Wheatstone bridge), accelerometers (or geophones), velocity measuring devices, displacement measuring devices, etc. If optical pressure sensors are used, the sensors 18-21 may be Bragg grating based pressure sensors, such as that described in U.S. patent application, Ser. No. 08/925,598, entitled "High Sensitivity Fiber Optic Pressure Sensor For Use In Harsh Environments", filed Sept. 8, 1997, now U.S. Pat. No. 6,016,702, and in U.S. patent application, Ser. No. 10/224,821, entitled "Non-Intrusive Fiber Optic Pressure Sensor for Measuring Unsteady Pressures within a Pipe", which are incorporated herein by reference. In an embodiment of the present invention that utilizes fiber optics as the pressure sensors 14 they may be connected individually or may be multiplexed along one or more optical fibers using wavelength division multiplexing (WDM), time division multiplexing (TDM), or any other optical multiplexing techniques.

In certain embodiments of the present invention, a piezoelectronic pressure transducer may be used as one or more of the pressure sensors 15-18 and it may measure the unsteady (or dynamic or ac) pressure variations inside the pipe 14 by measuring the pressure levels inside of the pipe. These sensors may be ported within the pipe to make direct contact with the process flow 12. In an embodiment of the present invention, the sensors comprise pressure sensors manufactured by PCB Piezotronics. In one pressure sensor there are integrated circuit piezoelectric voltage mode-type sensors that feature built-in microelectronic amplifiers, and convert the high-impedance charge into a low-impedance voltage output. Specifically, a Model 106B manufactured by PCB Piezotronics is used which is a high sensitivity, acceleration compensated integrated circuit piezoelectric quartz pressure sensor suitable for measuring low pressure acoustic phenomena in hydraulic and pneumatic systems.

It is also within the scope of the present invention that any strain sensing technique may be used to measure the variations in strain in the pipe, such as highly sensitive piezoelectric, electronic or electric, strain gages and piezo-resistive strain gages attached to the pipe 14. Other strain gages include resistive foil type gages having a race track configuration similar to that disclosed U.S. patent application Ser. No. 09/344,094, filed Jun. 25, 1999, now U.S. Pat. No. 6,354,147, which is incorporated herein by reference. The invention also contemplates strain gages being disposed about a predetermined portion of the circumference of pipe 14. The axial placement of and separation distance $\Delta X_1$, $\Delta X_2$ between the strain sensors are determined as described herein above.

It is also within the scope of the present invention that any other strain sensing technique may be used to measure the variations in strain in the pipe, such as highly sensitive piezoelectric, electronic or electric, strain gages attached to or embedded in the pipe 14.

The scope of the invention is intended to include using other types or kinds of sensors including ultrasonic sensors similar to that disclosed in CC-0680 (Express Mail No. EV 286 928 152 US) and U.S. patent application Ser. No. 60/439,715, filed Jan. 13, 2003. The other types or kinds of sensors may sense or measure any parameter that converts within a flow. For example, any inhomogeneities, including temperature, particles, turbulence eddies, acoustic variations or disturbances.

Scope of the Invention

The dimensions and/or geometries for any of the embodiments described herein are merely for illustrative purposes and, as such, any other dimensions and/or geometries may be used if desired, depending on the application, size, performance, manufacturing requirements, or other factors, in view of the teachings herein.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

The invention claimed is:

1. A method of determining an average flow rate of a fluid flowing in the pipe, said method comprising:
   measuring unsteady pressures using an array of sensors, wherein each sensor is spaced at different axial locations along the pipe;
   determining, in response to the measured unsteady pressures, a measured flow rate of the fluid flow; and
   relating the measured flow rate to the average flow rate of the fluid flow using a calibration correction function based on non-dimensional parameters that characterize the array of sensors, the pipe, and the fluid flowing in the pipe to determine the average flow rate,
   wherein the calibration correction function depends on a Reynolds number that characterizes the fluid flow in the pipe, and a ratio $f\Delta x/U_{meas}$ of usable frequencies in relation to the sensor spacing ($\Delta x$) and the measured flow rate ($U_{meas}$); and
   wherein the measured flow rate of the fluid flow is determined using an array processing algorithm.

2. The method according to claim 1, further includes determining the average volumetric flow rate (Q) of the fluid flow based on the equation:

$$Q = A * U_{av},$$

where A is a cross sectional area of the pipe's inner diameter and $U_{av}$ is the average flow rate.

3. The method according to claim 1, wherein the relating the measured flow rate to the average flow rate includes determining the average flow rate ($U_{av}$) based on the equation:

$$U_{av} = \text{the calibration correction function} * U_{meas},$$

where $U_{meas}$ is a measured flow rate.

4. The method according to claim 3, wherein the measured flow rate of the fluid flow is determined by measuring a slope of a convective ridge in a k-ω plane.

5. The method according to claim 1, wherein the sensors of the array of sensors include strain sensors or pressure sensors.

6. The method according to claim 1, wherein the array of sensors include at least 3 sensors.

7. The method according to claim 1, wherein the array of sensors include at least 4, 5, 6, 7, 8, 9, 10, 11, 12, 13, 14, 15, or 16 sensors.

8. The method according to claim 1, wherein the sensors are clamped onto the pipe.

9. The method according to claim 1, wherein the unsteady pressures are vortical disturbances with the fluid flow.

10. A flow meter for determining an average flow rate of a fluid flowing in the pipe, said flow meter comprising:
    an array of sensors having an array of sensors for measuring unsteady pressures to determine a measured flow rate of the fluid, wherein each sensor is spaced at different axial locations along the pipe; and
    a processor for relating the measured flow rate to the average flow rate of the fluid flow using a calibration correction function based on non-dimensional parameters that characterize array of sensors, the pipe, and the fluid flowing in the pipe to determine the average flow rate,
    wherein the calibration correction function depends on a ratio $f\Delta x/U_{meas}$ of usable frequencies in relation to the sensor spacing ($\Delta x$) and the measured flow rate ($U_{meas}$); and
    wherein the measured flow rate of fluid flow is determined using an array processing algorithm.

11. The flow meter according to claim 10, wherein the calibration correction function depends on a Reynolds number that characterizes the fluid flow in the pipe, and a ratio $f\Delta x/U_{meas}$ of usable frequencies in relation to the sensor spacing ($\Delta x$) and the measured flow rate ($U_{meas}$).

12. The flow meter according to claim 10, wherein the average flow rate is an average volumetric flow rate (Q) and the processor determines the average volumetric flow rate (Q) based on the equation:

$$Q = A * U_{av},$$

where A is a cross sectional area of the pipe's inner diameter and $U_{av}$ is an average flow rate.

13. The flow meter according to claim 10, wherein the calibration correction function module determines the average flow velocity ($U_{av}$) based on the equation:

$$U_{av} = \text{the calibration correction function} * U_{meas},$$

where $U_{meas}$ is a measured flow rate.

14. The flow meter according to claim 13, wherein the measured flow rate of fluid flow is determined by measuring a slope of a convective ridge in a k-ω plane.

15. The flow meter according to claim 10, wherein the sensors of the array of sensors include strain sensors or pressure sensors.

16. The flow meter according to claim 10, wherein the array of sensors include at least 3 sensors.

17. The flow meter according to claim 10, wherein the array of sensors include at least 4, 5, 6, 7, 8, 9, 10, 11, 12, 13, 14, 15, or 16 sensors.

18. The flow meter according to claim 10, wherein the sensors are clamped onto the pipe.

19. The flow meter according to claim 10, wherein the unsteady pressures are vortical disturbances with the fluid flow.

* * * * *